(12) United States Patent
Kapoor

(10) Patent No.: US 12,376,695 B2
(45) Date of Patent: Aug. 5, 2025

(54) CATENARY WIRE HOOK ATTACHMENT FOR HANGING ARTICLES OVER A HORIZONTAL WIRE

(71) Applicant: Rajan Kapoor, New Delhi (IN)

(72) Inventor: Rajan Kapoor, New Delhi (IN)

( * ) Notice: Subject to any disclaimer, the term of this patent is extended or adjusted under 35 U.S.C. 154(b) by 0 days.

(21) Appl. No.: 18/281,313

(22) PCT Filed: Feb. 22, 2023

(86) PCT No.: PCT/IN2023/050169
§ 371 (c)(1),
(2) Date: Sep. 11, 2023

(87) PCT Pub. No.: WO2024/069638
PCT Pub. Date: Apr. 4, 2024

(65) Prior Publication Data
US 2025/0024973 A1    Jan. 23, 2025

(30) Foreign Application Priority Data

Sep. 29, 2022 (IN) .............................. 202211056053

(51) Int. Cl.
*A47G 25/52* (2006.01)
*A47G 25/32* (2006.01)

(52) U.S. Cl.
CPC ............. *A47G 25/52* (2013.01); *A47G 25/32* (2013.01)

(58) Field of Classification Search
CPC ........ A47G 25/52; A47G 25/32; A47G 25/06; A47G 25/0607; A47G 25/065; A47G 25/0678; A47G 25/1442; A47G 25/145; A47G 25/1457; A47G 25/1478
See application file for complete search history.

(56) References Cited

U.S. PATENT DOCUMENTS

| 325,470 | A | * | 9/1885 | Young | D06F 57/00 |
| | | | | | 254/388 |
| 810,004 | A | * | 1/1906 | Tabler | F16L 3/13 |
| | | | | | 114/364 |
| 1,683,049 | A | * | 9/1928 | Penley | D06F 55/02 |
| | | | | | 24/336 |
| 2,344,339 | A | * | 3/1944 | Zwald | B60R 7/10 |
| | | | | | 224/927 |
| 4,296,959 | A | * | 10/1981 | Helbig | A47G 25/1457 |
| | | | | | 294/169 |
| 4,557,516 | A | * | 12/1985 | Usner | A47G 25/1457 |
| | | | | | 294/143 |
| 4,858,977 | A | * | 8/1989 | Mitchell | F16B 45/06 |
| | | | | | 294/82.11 |
| 5,836,486 | A | * | 11/1998 | Ohsugi | A47G 25/32 |
| | | | | | 211/113 |

(Continued)

Primary Examiner — Ismael Izaguirre

(57) ABSTRACT

The present invention provides a hook attachment for hanging articles of any shape, size and weight, over a tightened horizontal wire, where the hook attachment resists forces in both horizontal directions and resists unwanted torque that may be imposed by the applied load of the article on the hook. The hook includes at least two parts: a wire coupling part and a load bearing part. The wire coupling part is a part of the hook where the hook flexibly couples with the tightened horizontal wire, and the load bearing part is the part where an article can be hanged in the hook.

11 Claims, 2 Drawing Sheets

(56) References Cited

U.S. PATENT DOCUMENTS

| | | | |
|---|---|---|---|
| 7,533,916 B2 * | 5/2009 | Eichenbaum | A45F 5/1026 294/170 |
| D709,760 S * | 7/2014 | Castell, Jr. | D9/434 |
| 8,840,071 B2 * | 9/2014 | Oh | F16L 3/1075 248/65 |

* cited by examiner

CATENARY WIRE HOOK ATTACHMENT FOR HANGING ARTICLES OVER A HORIZONTAL WIRE

The present invention is generally related to devices for suspending articles above ground. More particularly, the present invention relates to a device for hanging articles over a tightened horizontal wire.

BACKGROUND OF INVENTION

In general, for hanging article over a wire which is already tightened horizontally, more robust and tricky assemblies are used, which may be very tedious and unsafe to use.

Conventionally, hooks for hanging articles up on wires are well known. Hooks are well known in the prior art for suspending articles. In some applications where the hook is subject to a component of force generally parallel to the horizontal wire there is a requirement to prevent the hook from sliding along the horizontal wire. Other products in the prior art use various complex gripping mechanisms to achieve this. These mechanisms can be expensive to produce and suffer from reliability problems due to their complexity.

For example, hooks for hanging articles or products up on wires which are subject to components of horizontal force are also well-known (e.g., Gripple C-Clip). However, these hooks and related assemblies are complex and have reliability issues, and one cannot take chances to hang or suspend articles above the ground with reliability issues in mind. Another example may include devices that grip rope or wire by means of fixed teeth, which are also well known in the marine industry. Additionally, spring retention clips are well known in the markets. Another example can be a heavy duty drop ceiling hooks, that is usually a one-piece hook, either full or partially S-shaped, with a T-shaped end parts that can be opened up and secured to metals bars in the drop ceiling grid. The articles here can be hanged on the S-shape of the hook. However, such hooks are tricky, which may be unsafe to use. The open end of the S-shape may allow a space for the articles to get unhooked and fall.

Another fallback of the conventional hangers or hooks may be their complicated design for engaging with the rope. For position adjustment along the horizontal axis, one needs to completely disengage the hook off the wire and apply the horizontal force along the horizontally tightened wire or rope or bar. To disengage the hook and apply such horizontal force, an operator might have to reach the top of the ceiling where the rope is secured in the ceiling, and manually adjust the position of the hooks on that rope. Such task can be tedious, risky and time and energy consuming.

Hence, there is a need for designing and developing a device, e.g., a cathook attachment for suspending articles of any size, shape and weight on a horizontal wire, above the ground, which is easy to use and is flexible, and is trustworthy for suspending articles.

OBJECTIVES OF THE INVENTION

Thus, the present invention provides a device, e.g., a cat-hook attachment for suspending articles over a horizontally tightened wire, rope, or bar, above the ground.

It is an object of the present invention to provide a device that is easy to use and is flexible.

Another object of the present invention to provide a device that is safe and trustworthy for hanging articles above the ground.

Another object of the present invention is to provide a device that may take up a desired load of an article.

It is an object of the present invention to provide a device with an improved method of preventing the device from slipping along the horizontal wire when subjected to a component of force in that direction.

Another object of the present invention is to provide a device that may be flexibly positioned horizontally along the wire while an operator being on the ground, or without the operator manually reaching around the horizontal wire, which can be secured at top of a ceiling. So, the present invention provides a device that may avoid a user to go up to a ceiling, in case the wire is secured in the ceiling, and adjust the position of the device horizontally along the wire.

To further clarify the advantages and features of the present invention, a more elaborate description of the invention will be rendered by reference to specific embodiments thereof, which is illustrated in the appended drawings. It is appreciated that these drawings depict only typical embodiments of the invention and are therefore not to be considered limiting of its scope.

SUMMARY OF INVENTION

An aspect of the present invention provides a device for hanging articles over a tensioned horizontal wire, comprising: a wire coupling part to flexibly couple the hook attachment over the tensioned horizontal wire, the wire coupling part including: a pivotable clip that is pivotably hinged to bottom of a load bearing part; and a hook portion that couples or aligns with the pivotable clip and forms an enclosure of the wire coupling part when aligned with the pivotable clip; where, a mere push on the pivotable clip misaligns the pivotable clip from the hook portion to open up the enclosure, and the hook attachment is inserted into the tensioned horizontal wire through the opened-up enclosure, and the enclosure is closed by bringing the pivotable clip back to its original position to align with the hook portion; and where the wire coupling part flexibly allows movement of the hook attachment along the tensioned horizontal wire in both horizontal directions, and the alignment of the pivotable clip with the hook portion to form the enclosure prevents the hook attachment from falling off the tensioned horizontal wire providing safety of articles hung from the hook attachment from falling down; and the load bearing part including a groove to hang an article in the hook attachment; and wherein, the hook attachment with the closed enclosure along with a downward force of the applied load of the article resist forces in both horizontal directions over the tensioned horizontal wire and resist unwanted torque that may be imposed by the applied load of the article on the hook attachment; and wherein, to reposition the hook attachment over the tensioned horizontal wire, the article is simply taken off, which takes off the downward force of the applied load, and the hook attachment is simply shifted to another position over the tensioned horizontal wire, without completely disengaging the hook attachment from the tensioned horizontal wire.

An embodiment of the present invention provides a device wherein the wire coupling part and the load bearing part are joined together to form the hook attachment, where the wire coupling part couples with the tensioned horizontal wire above, and the load bearing part bears the load of the article below.

Another embodiment of the present invention provides a device where the wire coupling part and the load bearing part are assembled together detachably to form the hook attachment.

An embodiment of the present invention provides a hook attachment wherein the groove has a curved shaped like a smiley [ ] to hang the articles.

Another embodiment of the present invention provides a device wherein the groove has a U-shape, or a V-shape, or a square shape, or an oval-shape, or a W-shape, as long as the groove ensures that the applied load of the hanging article does not impose unwanted torque on the hook attachment.

An embodiment of the present invention provides a device wherein the hook portion has a U-shape, or a V-shape, or a square shape, or an oval-shape, or a W-shape, as long as it aligns with the pivotable clip and couples safely with the tensioned horizontal wire.

An embodiment of the present invention provides a device wherein the hook attachment is used for hanging articles over a tensioned horizontal wire, rope, or a bar, at any height, above the ground.

An embodiment of the present invention provides a device wherein the hook attachment is used for hanging articles for hanging articles of any shape, size and weight, over the tensioned horizontal wire.

An embodiment of the present invention provides a device wherein the design of the groove ensures that the applied load of the hanging article does not impose unwanted torque on the hook, preventing disengaging the wire coupling part of the hook attachment from the tensioned horizontal wire.

Another aspect of the present invention provides device for hanging articles over a tensioned horizontal wire, comprising: a wire coupling part to flexibly couple the device over the tensioned horizontal wire, the wire coupling part including: a pivotable clip that is pivotably hinged to bottom of a load bearing part; a hook portion that couples or aligns with the pivotable clip and forms an enclosure of the wire coupling part when aligned with the pivotable clip, the tensioned horizontal wire goes through the enclosure; and multiple pairs of opposing teeth provided, at least in part, on the inner surface of the hook portion, each pair of opposing teeth includes a tapered gap in between opposing teeth to engage the diameter of the tensioned horizontal wire, and the pairs of opposing teeth are spaced apart on the inner surface of the hook portion at a distance equal to the lay length of the tensioned horizontal wire divided by the number of strands in the outer layer of the tensioned horizontal wire; and the load bearing part including a groove to hang an article in the device; and wherein, the device with the closed enclosure, along with a downward force of the applied load of the article, resists forces in both horizontal directions over the tensioned horizontal wire and resists unwanted torque that is imposed by the applied load of the article on the device; and wherein, to reposition the device over the tensioned horizontal wire, the article is simply taken off, which takes off the downward force of the applied load, and the device is shifted to another position over the tensioned horizontal wire, without completely disengaging the device from the tensioned horizontal wire.

BRIEF DESCRIPTION OF DRAWINGS

For a better understanding of the embodiments of the machine and methods described herein, and to show more clearly how they may be carried into effect, references will now be made, by way of example, to the accompanying drawings, wherein like reference numerals represent like elements/components throughout and wherein.

DETAILED DESCRIPTION OF INVENTION

This patent describes the subject matter for patenting with specificity to meet statutory requirements. However, the description itself is not intended to limit the scope of this patent. The principles described herein may be embodied in many different forms.

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

The present invention provides a device, e.g., a hook attachment, for hanging articles of any shape, size and weight, over a tightened tensioned horizontal wire, where the device resists forces in both horizontal directions and resists unwanted torque that may be imposed by the applied load of the article on the device.

The device (may interchangeably referred to as "hook" from hereinafter, but is not limited to "hook") may include at least two parts: a wire coupling part and a load bearing part. The wire coupling part is a part of the hook where the hook flexibly couples with the tightened horizontal wire, and the load bearing part is the part where an article can be hanged in the hook. The wire coupling part allows movement of the hook along the wire in both horizontal directions, and the load bearing part is designed such that it ensures that the applied load of the hanging article does not impose unwanted torque on the hook, which may further disengage the wire coupling part of the hook from the wire.

In an embodiment, the wire coupling part and the load bearing part are assembled together to form the hook attachment, where the wire coupling part couples with the wire above, and the load bearing part bears the load below. In an embodiment, the wire coupling part and the load bearing part are assembled together detachably.

Figure 1:
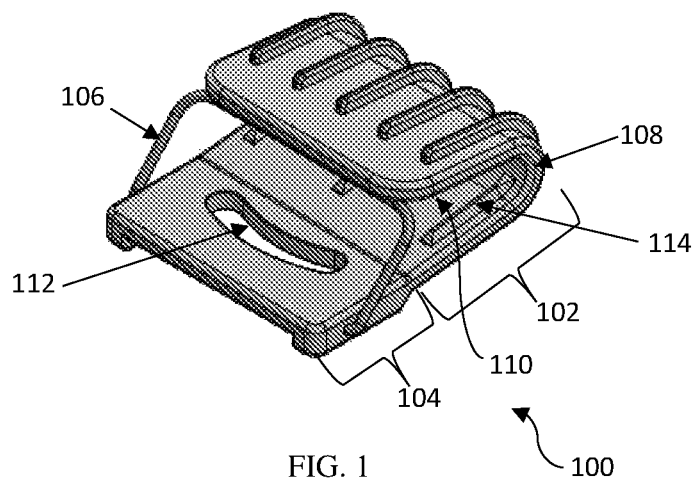
FIG. 1 illustrates an exemplary diagram showing a perspective view of a device for hanging articles above ground, in accordance with an embodiment of the present invention.
Figure 2:
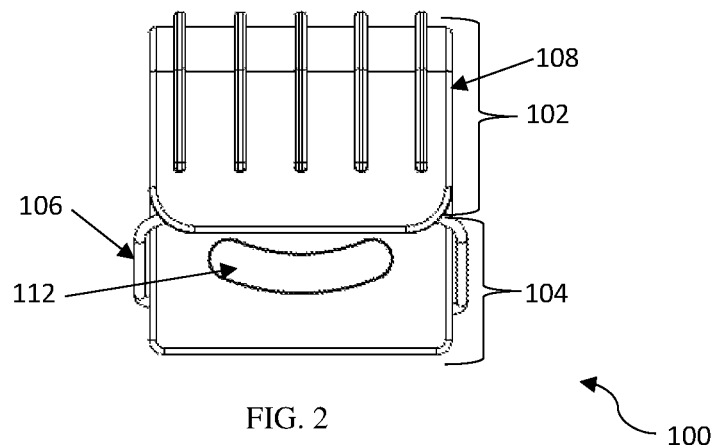
FIG. 2 illustrates an exemplary diagram showing a top view of the device, in accordance with an embodiment of the present invention.
Figure 3:
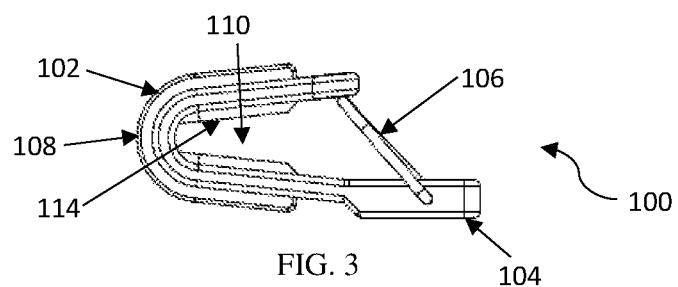
FIG. 3 illustrates an exemplary diagram showing a left side view of the device, in accordance with an embodiment of the present invention.
Figure 4:
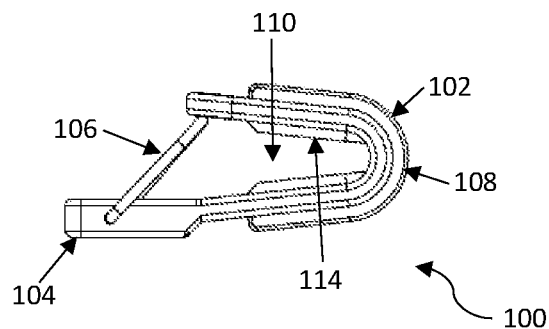
FIG. 4 illustrates an exemplary diagram showing a right side view of the device, in accordance with an embodiment of the present invention.
Figure 5:
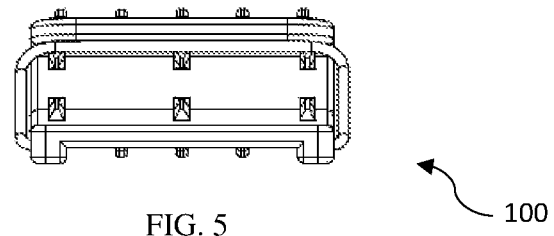
FIG. 5 illustrates an exemplary diagram showing a front view of the device, in accordance with an embodiment of the present invention.
Figure 6:
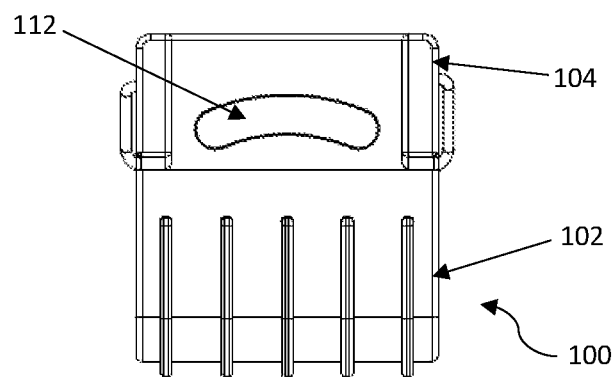
FIG. 6 illustrates an exemplary diagram showing a bottom view of the device, in accordance with an embodiment of the present invention.
Figure 7:
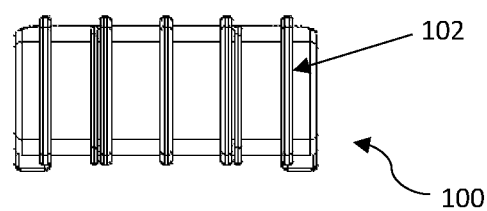
FIG. 7 illustrates an exemplary diagram showing a rear view of the device, in accordance with an embodiment of the present invention.

FIG. 1 illustrates an exemplary diagram showing a perspective view of the device 100. As mentioned above, the device or the hook 100 includes a wire coupling part 102 and a load bearing part 104. In an embodiment, the wire coupling part 102 further includes a pivotable clip 106 that is hinged to the bottom of the load bearing part 104. The wire coupling part 102 also includes a bent U-shaped portion 108 that couples or aligns with the pivotable clip 106, and forms an enclosure 110 of the wire coupling part 102. The hook 100 can be hung over a tightened and tensioned wire with a mere push on the pivotable clip 106, which misaligns the clip 106 from the U-shaped portion 108, and that opens up the enclosure 110 of the wire coupling part 102; inserting the wire into the enclosure 110 of the wire coupling part 102; and bringing the clip 106 back to its original position which aligns with the U-shaped portion 108. Hence, the wire can be securely coupled to the wire coupling part 102 of the hook 100, with just a little push on the clip 106, and the hook 100 is ready to bear a load of an article.

In an embodiment, the load bearing part 104 includes a groove or a curved slot 112, for example, shaped like a smiley [◡]. Any desired article, with any shape, size and weight can be hung in the groove 112. The curved groove 112 ensures that the applied load of the hanging article does not impose unwanted torque on the hook 100. The articles can be hung removably or may be fixed on the groove 112, depending on the requirements, without deviating from the meaning and scope of the present invention.

The pivotable clip 106 provided at one end of the hook 100 prevents the hook 100 from falling out of the wire and thus provides the safety of the articles from falling down, when someone tries to tamper with the hook 100. Also, the wire coupling part 102 including the clip 106 aligned with the U-shaped portion 108, resists forces in both horizontal directions, which securely positions the hook 100 over the wire and does not cause unwanted movements of the hook 100 over the wire.

Further, owing to the simple design of the hook 100, the hook 100 is securely coupled to the wire due to the downward force of the applied load of the article, which also does not cause unwanted movements of the hook 100 over the wire. If, however, the hook 100 has to be re-positioned to another position on the wire, again owing to the simple design of the hook 100, one has to simply remove the applied load of the article, which takes off the downward force of the applied load, and shift the hook 100 to the other position, without disengaging the hook 100 from the wire. Unlike conventional hooks, where one has to disengage the hook completely off the wire, and then reposition the hook on the wire. This saves a user their time and energy, and it is easy to use.

In an embodiment, the inner surface of the hook 100 is provided with a number of teeth 114 positioned to engage with the horizontal wire. The teeth 114 are arranged in such a way that they engage with a range of diameters of the horizontal wire. In the embodiment shown, the teeth 114 are arranged in opposing pairs such that the gap between them is tapered, so that the gap can accept a range of diameters of horizontal wire.

The pairs of teeth 114 may also be spaced apart such that the distance between each pair of teeth 114 is generally equal to the lay length of the wire divided by the number of strands in the outer layer. Typically, in a 7 by 7 wire construction there are six strands in the outer layer. Spacing the pairs of teeth 114 apart in this way means that the teeth 114 naturally want to grip the horizontal wire in the small depressions between each individual strand on the surface. The number, position, and taper of the teeth 114 can be varied according to the precise design and construction of the horizontal wire.

The purpose of the curved slot 112 is to prevent the suspended article imposing any unwanted torque on the hook 100 that may tend to disengage one or more pairs of teeth 114. Generally, the center of the arc in the curved slot 112 that describes the slot 112 should be at the center point of the teeth 114.

In an embodiment, the device 100 is a cat-hook.

It may be apparent to a person ordinary skilled in the art that the hook 100 may not be designed only in the way as shown in the FIGS. 1-7, but can also include certain variations in design and structure, without deviating from the meaning and scope of the present invention. For example, the U-shaped portion 108 may not just be U-shaped, it can be V-shaped also, or square shaped, or oval-shaped, and the like, as long as it aligns with the clip 106 and couples safely with the wire. Also, for example, the groove 112 in the load bearing part 104 may just not be shaped like a smiley [◡], but it can also have different shapes, as long as it ensures that the applied load of the hanging article does not impose unwanted torque on the hook 100. Other exemplary variations can also be included in the present invention.

It may also be apparent to a person ordinary skilled in the art that the hook 100 may be applied to hang articles over a tightened and tensioned wire, rope, bar, and the like elements, at any height, above the ground, for example around the ceiling, without deviating from the meaning and scope of the present invention.

The hook 100 can be applied in wire hanging systems, example in electrical accessories, HVAC, among other suitable applications, without deviating from the meaning and scope of the present invention.

Advantageously, the hook in the present invention is simple in design, easy to manufacture and use. The hook is flexible, also is safe and trustworthy for hanging articles above the ground. The hook attachment of the present invention may take up a desired load of an article.

Additionally, the hook attachment may be flexibly positioned horizontally along the wire while an operator being on the ground, without disengaging the hook from the wire, e.g., without the operator manually reaching around the horizontal wire, which can be secured at top of a ceiling, owing to the simple design of the hook. So, the present invention provides a hook attachment that may avoid an operator to go up to a ceiling, in case the wire is secured in the ceiling, and adjust the position of the hook attachment horizontally along the wire.

It is intended that the disclosure and examples be considered exemplary only. Though the present disclosure includes examples from electrical accessories, HVAC, the hook disclosed herein may be employed for various applications as would be appreciated by one skilled in the art. The references to devices and structures used here are intended to be applied or extended to the larger scope and should not be construed as restricting the scope and practice of the present invention.

While certain embodiments have been described, these embodiments have been presented by way of example only and are not intended to limit the scope of the present disclosure. Indeed, the novel methods, devices, and systems described herein may be embodied in a variety of other forms. Furthermore, various omissions, substitutions, and changes in the form of the methods, devices, and systems described herein may be made without departing from the spirit of the present disclosure.

The invention claimed is:

1. A device for hanging articles over a tensioned horizontal wire, comprising:

a wire coupling part including:
a hook portion that flexibly couples the device over the tensioned horizontal wire; and
a pivotable clip that is pivotably hinged to bottom of a load bearing part and the hook portion couples or aligns with the pivotable clip and forms an enclosure of the wire coupling part when aligned with the pivotable clip,
where the wire coupling part flexibly allows movement of the device along the tensioned horizontal wire in both horizontal directions; and
the load bearing part including a groove to hang an article in the device; and
wherein, the device with the closed enclosure when applied with a downward force of the applied load of the article, resists forces in both horizontal directions over the tensioned horizontal wire and resists unwanted torque that is imposed by the applied load of the article on the device; and
wherein, to reposition the device over the tensioned horizontal wire, the article is taken off, which takes off the downward force of the applied load, and the pivotable clip is misaligned with the hook portion to open the enclosure of the wire coupling part, and the device is shifted to another position over the tensioned horizontal wire, without completely disengaging the device from the tensioned horizontal wire.

2. The device of claim 1, wherein the wire coupling part and the load bearing part are joined together to form the device, where the wire coupling part couples with the tensioned horizontal wire above, and the load bearing part bears the load of the article below.

3. The device of claim 1, wherein the wire coupling part and the load bearing part are assembled together detachably to form the device.

4. The device of claim 1, wherein the groove has a curved shape like a smiley [ᴗ], or a U-shape, or a V-shape, or a square shape, or an oval-shape, or a W-shape to hang the articles, as long as the groove ensures that the applied load of the hanging article does not impose unwanted torque on the device.

5. The device of claim 4, wherein the hook portion has a U-shape, or a V-shape, or a square shape, or an oval-shape, or a W-shape, as long as it aligns with the pivotable clip and couples safely with the tensioned horizontal wire.

6. The device of claim 1, wherein, a mere push on the pivotable clip misaligns the pivotable clip from the hook portion to open up the enclosure, and the device is inserted into the tensioned horizontal wire through the opened-up enclosure, and the enclosure is closed by bringing the pivotable clip back to its original position to align with the hook portion; and where the wire coupling part flexibly allows movement of the device along the tensioned horizontal wire in both horizontal directions, and the alignment of the pivotable clip with the hook portion to form the enclosure prevents the device from falling off the tensioned horizontal wire providing safety of articles hung from the device from falling down.

7. A device for hanging articles over a tensioned horizontal wire, comprising:
a wire coupling part including a hook portion that flexibly couples the device over the tensioned horizontal wire,
where the wire coupling part flexibly allows movement of the device along the tensioned horizontal wire in both horizontal directions, the wire coupling part further including:
multiple pairs of opposing teeth provided, at least in part, on the inner surface of the hook portion, each pair of opposing teeth includes a tapered gap in between opposing teeth to engage the diameter of the tensioned horizontal wire, and the pairs of opposing teeth are spaced apart on the inner surface of the hook portion at a distance equal to the lay length of the tensioned horizontal wire divided by the number of strands in the outer layer of the tensioned horizontal wire; and
the load bearing part including a groove to hang an article in the device; and
wherein, the device when applied with a downward force of the applied load of the article, resists forces in both horizontal directions over the tensioned horizontal wire and resists unwanted torque that is imposed by the applied load of the article on the device; and
wherein, to reposition the device over the tensioned horizontal wire, the article is taken off, which takes off the downward force of the applied load, and the device is shifted to another position over the tensioned horizontal wire, without completely disengaging the device from the tensioned horizontal wire.

8. The device of claim 7, wherein the wire coupling part includes: a pivotable clip that is pivotably hinged to bottom of the load bearing part; and the hook portion that couples or aligns with the pivotable clip and forms an enclosure of the wire coupling part when aligned with the pivotable clip, and wherein, the device with the closed enclosure, along with the downward force of the applied load of the article, resists forces in both horizontal directions over the tensioned horizontal wire and resists unwanted torque that is imposed by the applied load of the article on the device.

9. The device of claim 8, where, a mere push on the pivotable clip misaligns the pivotable clip from the hook portion to open up the enclosure, and the device is inserted into the tensioned horizontal wire through the opened-up enclosure, and the enclosure is closed by bringing the pivotable clip back to its original position to align with the hook portion; and where the wire coupling part flexibly allows movement of the device along the tensioned horizontal wire in both horizontal directions, and the alignment of the pivotable clip with the hook portion to form the enclosure prevents the device from falling off the tensioned horizontal wire providing safety of articles hung from the device from falling down.

10. The device of claim 7, wherein the groove has a curved shape like a smiley [ᴗ], or a U-shape, or a V-shape, or a square shape, or an oval-shape, or a W-shape to hang the articles, as long as the groove ensures that the applied load of the hanging article does not impose unwanted torque on the device.

11. The device of claim 10, wherein the hook portion has a U-shape, or a V-shape, or a square shape, or an oval-shape, or a W-shape, as long as it aligns with the pivotable clip and couples safely with the tensioned horizontal wire.

* * * * *